May 11, 1954

G. N. WARNICK 2,677,941

AIR CONDITIONING AND REFRIGERATION TRAILER

Filed April 29, 1953

Inventor
George N. Warnick

By Litherstonlaugh

PATENT ATTORNEYS

Patented May 11, 1954

2,677,941

UNITED STATES PATENT OFFICE 2,677,941

AIR CONDITIONING AND REFRIGERATION TRAILER

George N. Warnick, Calgary, Alberta, Canada

Application April 29, 1953, Serial No. 351,837

3 Claims. (Cl. 62—102)

My invention relates to new and useful improvements in the preservation and refrigeration of meat during transportation. More particularly to the transportation and preservation of meat carcasses by road transport, the essence of my invention being to provide a trailer or van in which the meat may be suspended and which, while giving efficient free and complete circulation of air around all of the carcasses, nevertheless eliminates spoilage of the meat engendered by the striking of the meat surfaces by refrigerated air.

A further object of my invention is to provide a device of the character herewithin described which permits meat carcasses to be transported by road over relatively long distances without spoilage and at a relatively economical rate.

Still another object of my invention is to provide a device of the character herewithin described which includes means to regulate the volume of air being circulated through the interior of the van or trailer.

Still another object of my invention is to provide a device of the character herewithin described which is extremely simple in construction, economical in operation, and otherwise particularly well suited for the purpose for which it is designed.

With the foregoing objects in view, and such other objects and advantages as will become apparent to those skilled in the art to which this invention relates, as this specification proceeds, my invention consists essentially in the arrangement and construction of parts all as hereinafter more particularly described, reference being had to the accompanying drawings in which.

In the drawings like characters of reference indicate corresponding parts in the different figures.

Conventional refrigerated vans or trailers are normally provided with transverse rails upon which the carcasses may be suspended thus causing considerable difficulty in the circulation of refrigerated air therearound. This difficulty is added to by the fact that it is undesirable to have refrigerated air impinging directly upon the meat surfaces, as such an air stream striking the meat will spoil the color, thus reducing the marketing attractiveness of the meat and even the quality thereof.

This invention overcomes these disadvantages inasmuch as there is free and complete circulation of the refrigerated air through the van without any likelihood of the air stream striking the meat directly.

Figure 1:
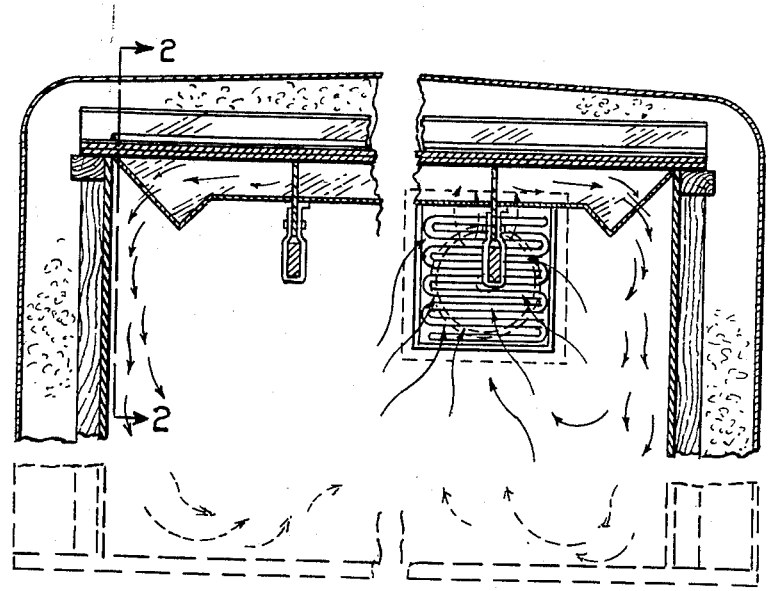
Figure 1 is a fragmentary transverse sectional view of a trailer with my device installed therein.
Figure 2:
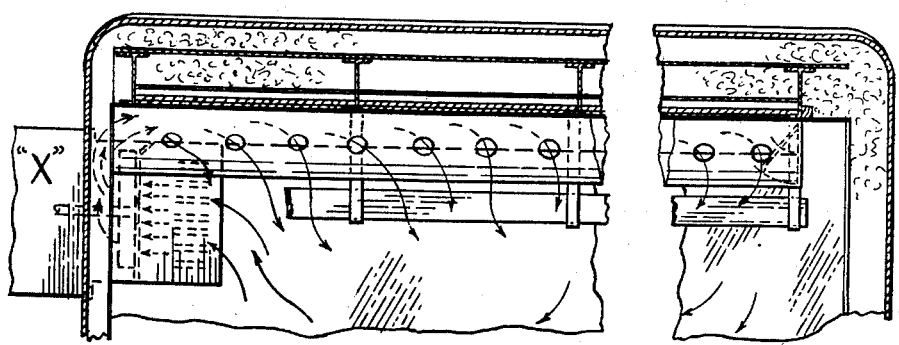
Figure 2 is a fragmented longitudinal sectional view substantially along the line 2—2 of the Figure 1.
Figures 3, 4:
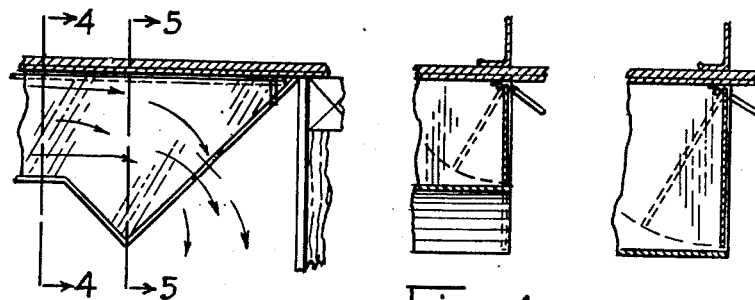
Figure 3 is a fragmentary rear end view of the air duct in elevation showing the hinged air regulating damper.
Figure 4 is a sectional view substantially along the line 4—4 of Figure 3.
Figure 5:
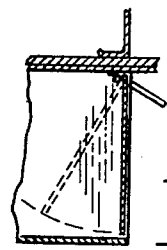
Figure 5 is a sectional view substantially along the line 5—5 of Figure 3.

Proceeding therefore to describe my invention in detail, it will be seen upon reference to Figure 1 of the accompanying drawings that I have illustrated a transverse section of a typical van or trailer including side walls generally designated 1, a ceiling generally designated 2, a floor generally designated 3, and front and end walls 4 and 5 respectively. In this connection it will be noticed that the wall structure includes insulation 6 which may take any conventional form.

Spanning the side walls 1 and supported upon stubs and plates 7 is a plurality of girders 8 from which are suspended hanger components 9 carrying carcass carrying rail 10 and it will be observed that these rails run longitudinally of the vehicle or parallel to the side walls thereof.

A refrigerating unit generally designated 11 is situated adjacent the front end of the trailer and is adapted to be actuated from the engine of the vehicle. This unit includes an evaporator 12 carried within a casing 13 and a circulating fan 14 also driven from the engine and situated, in this embodiment, in front of the evaporator. This fan is adapted to draw air from the interior of the trailer past the evaporator, thus cooling the air. The air is then discharged into a duct 15 formed between the fan and the front wall 4 of the trailer, said duct extending upwardly and discharging into a distribution manifold collectively designated 16. This manifold consists of a central panel 17 extending substantially from the front to the rear of the trailer and spaced apart from the ceiling thereof. This panel also extends substantially to the side walls of the trailer, but is provided with downwardly and outwardly depending flanges 18 extending from the side edges 19 of the panel and upwardly and outwardly extending side panels 20 which extend from the lower edges of the flanges to the junction 21 between the side walls 1 and the ceiling 2 of the trailer, thus forming a distribution manifold having the cross-sectional configuration clearly illustrated in Figure 1 of the drawings and it should be appreciated that this manifold extends from the front of the vehicle substantially toward the rear of the vehicle.

A plurality of air discharge outlets 22 are provided along the side panels 20, which, due to their positioning, cause air passing from the distribution manifold to impinge against the side walls of the vehicle and then float downwardly toward the floor whereupon it circulates and is drawn back past the evaporator 12 by the fan 14.

Means to control the volume of flow of the air through outlets 22 are provided and take the form of an air regulating damper 23. This damper spans the open rear end of the manifold 16 and has a configuration similar to the cross-sectional configuration of the manifold. This damper 23 is hinged along the upper edge 24 thereof to the ceiling or upper part of the manifold and the position thereof is controlled by means of the hand operated lever 25, it being understood that when the damper is closed it closes off the rear end of the manifold thus ensuring that the greatest volume of air passes through the outlet apertures 22.

By the provision of this form of distribution of air, coupled with the longitudinal positioning of the rails 10, it will be seen that complete air circulation is ensured around the carcasses carried by the rail 10 and at the same time the possibility of the refrigerated air impinging upon the meat surfaces is eliminated.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A refrigerating and air conditioning trailer for the transportation and preserving of meat and the like, comprising in combination an insulated trailer body including side walls, ceiling and floor therefor, a refrigerating unit in association with said trailer, said unit including an evaporator and a circulating fan, said fan being adapted to circulate air from the interior of said trailer past said evaporator, a duct into which said air is discharged, and a distribution manifold spanning the ceiling of said trailer and extending substantially from the front to rear ends thereof, and air discharge outlets in said manifold adjacent the side walls of said trailer, said manifold, when viewed in cross-section, embodying a central panel parallel with and spaced from said ceiling, downwardly and outwardly descending flanges on the side edges of said panel and upwardly and outwardly extending side panels, extending from the lower ends of said flanges to the junction between said side walls and said ceiling, said air discharge outlets being situated in said side panels.

2. The device according to claim 1 which includes means to regulate the volume of air passing through said air outlet, said means including an air regulating damper hinged along the upper edge thereof to the upper side of said manifold adjacent the rear end thereof, the configuration of said damper being substantially similar to the cross-sectional configuration of said manifold.

3. The device according to claim 2 which includes a plurality of carcass carrying rails suspended from said ceiling and parallel with said side walls.

References Cited in the file of this patent

UNITED STATES PATENTS

| Number | Name | Date |
|---|---|---|
| 1,416,492 | Morawski | May 16, 1922 |
| 1,973,022 | Strobell | Sept. 11, 1934 |
| 2,206,631 | Clark | July 2, 1940 |
| 2,523,957 | Kleist | Sept. 26, 1950 |